US010243395B2

United States Patent
Fieber et al.

(10) Patent No.: US 10,243,395 B2
(45) Date of Patent: Mar. 26, 2019

(54) CONTROL METHOD AND SYSTEM WITH AN INVERTER, A DIRECT CURRENT SOURCE, AND AN ADDITIONAL DIRECT CURRENT SOURCE OR A DIRECT CURRENT SINK

(71) Applicant: AMBIBOX GMBH, Mainz (DE)

(72) Inventors: Kai Fieber, Saulheim (DE); Manfred Przybilla, Mainz (DE); Sascha Lehrmann, Bolanden (DE)

(73) Assignee: AmbiBox GmbH, Mainz (DE)

( * ) Notice: Subject to any disclaimer, the term of this patent is extended or adjusted under 35 U.S.C. 154(b) by 571 days.

(21) Appl. No.: 14/676,368

(22) Filed: Apr. 1, 2015

(65) Prior Publication Data

US 2015/0318703 A1   Nov. 5, 2015

(30) Foreign Application Priority Data

Apr. 14, 2014  (EP) .................................. 14001342.6

(51) Int. Cl.
*H02J 7/35*  (2006.01)
*H02J 3/38*  (2006.01)

(52) U.S. Cl.
CPC ............... *H02J 7/35* (2013.01); *H02J 3/383* (2013.01); *Y02E 10/563* (2013.01); *Y02E 10/566* (2013.01); *Y10T 307/50* (2015.04)

(58) Field of Classification Search
CPC ........................................................ H02J 7/35
USPC ........................................................... 307/43
See application file for complete search history.

(56) References Cited

U.S. PATENT DOCUMENTS 8,854,004 B2     10/2014  Lee
2012/0267952 A1* 10/2012  Ballatine ................. H02J 1/102
                                                          307/26
2013/0087244 A1   4/2013  Maier
2013/0257152 A1  10/2013  Matsui

FOREIGN PATENT DOCUMENTS

AU        2013218374 A1    9/2014
DE   10 2012 109 429 A1    4/2013
JP           H1031525 A    2/1998
(Continued)

OTHER PUBLICATIONS

European Search Report for European Application EP 14 001 342, dated Oct. 14, 2014.

*Primary Examiner* — Joseph Chang
(74) *Attorney, Agent, or Firm* — Howard IP Law Group (57) ABSTRACT

A control method for a system having an inverter with a direct current (DC) connection includes a DC source and an additional DC source or DC sink connected in parallel to the DC connection. An actuator configured to adjust at least one of voltage at the DC source, current supplied by the DC source, and output supplied by the DC source, or the voltage at the DC sink, current drawn by the DC sink, and the output drawn by the DC sink adjusts at least one parameter of the system relating to at least one of voltage, current, and output at the DC source, the DC sink, and/or the DC connection such that voltage at the DC connection, current flowing through the DC connection, output supplied through the DC connection to the inverter, or output supplied through the DC connection from the inverter, corresponds to a predetermined value.

20 Claims, 1 Drawing Sheet

(56) References Cited

FOREIGN PATENT DOCUMENTS

| | | |
|---|---|---|
| JP | 2012010531 A | 1/2012 |
| JP | 2012147508 | 8/2012 |
| JP | 2012147661 A | 8/2012 |
| JP | 2013138530 A | 7/2013 |
| JP | 2013138540 A | 7/2013 |
| JP | 2014106935 A | 6/2014 |
| WO | 2013002302 A1 | 1/2013 |
| WO | 2013117305 A2 | 8/2013 |

* cited by examiner

CONTROL METHOD AND SYSTEM WITH AN INVERTER, A DIRECT CURRENT SOURCE, AND AN ADDITIONAL DIRECT CURRENT SOURCE OR A DIRECT CURRENT SINK

CROSS-REFERENCE TO RELATED APPLICATIONS

This application claims the benefit of priority under 35 U.S.C. § 119(a) to European Patent Application No. 14 001 342.6, filed Apr. 14, 2014, which is incorporated herein by reference in its entirety for all purposes.

FIELD OF THE INVENTION

This application relates to power inverters.

BACKGROUND OF THE INVENTION

The invention relates to a control method for a system having an inverter with a direct current connection, a direct current source, and an additional direct current source or a direct current sink, wherein the direct current source and the additional direct current source or the direct current sink are connected in parallel to the direct current connection of the inverter. Furthermore, the invention also relates to such a system.

DE 10 2012 109 420 A9 discloses a system with an inverter which has a DC/DC converter and a DC/AC converter, as well as a direct voltage link to which the DC/DC converter and DC/AC converter are connected. This inverter has a direct current connection; that is, the input-side connection for the DC/DC converter. The system has a direct current source in the form of a photovoltaic system (designated a photovoltaic generator in the document). Furthermore, the system has a component in the form of a battery that can be used both as an additional direct current source (when drawing power from the battery) as well as a direct current sink (when charging the battery). The photovoltaic system and the battery are connected in parallel to the direct current connection of the inverter (at the input of the DC/DC converter). With the system known from DE 10 2012 109 420 A9, it is furthermore provided to connect the battery to the direct voltage link. This makes it possible to charge the battery directly with energy generated by the PV system by circumventing the DC/DC converter. DE 10 2012 109 420 A9 addresses the issue of which operating states are for charging the battery directly by means of the PV system, and which operating states are for charging the battery by means of the direct voltage link.

Against this background, the invention addresses the task of increasing the efficiency of operating such a system.

SUMMARY

A control method for a system having an inverter with a direct current (DC) connection includes a DC source and an additional DC source or DC sink connected in parallel to the DC connection. An actuator configured to adjust at least one of voltage at the DC source, current supplied by the DC source, and output supplied by the DC source, or the voltage at the DC sink, current drawn by the DC sink, and the output drawn by the DC sink adjusts at least one parameter of the system relating to at least one of voltage, current, and output at the DC source, the DC sink, and/or the DC connection such that voltage at the DC connection, current flowing through the DC connection, output supplied through the DC connection to the inverter, or output supplied through the DC connection from the inverter, corresponds to a predetermined value.

DETAILED DESCRIPTION

The invention is based on the fundamental concept of selecting the direct current connection of the inverter, i.e. the input side of the inverter, as a relevant reference point for controlling. The control method makes it possible to regulate to a predetermined value:
 the voltage at the direct current connection, and/or
 the current flowing through the direct current connection, and/or
 the output supplied to the inverter through the direct connection, or the output supplied from the inverter through the direct current connection.

Frequently, inverters have maximum power point (MPP) tracking. In one embodiment, the MPP tracking is realized by a direct current converter provided as a part of the inverter and is enabled as a step-up converter, step-down converter or inverter. The control actions undertaken internally by the inverter during MPP tracking stress the inverter, leading to intrinsic heating and aging. The control method according to the invention makes it possible to maintain the voltage, current and/or output level at the input of the inverter such that the inverter can function at the operating point selected by the inverter during MPP tracking. Likewise, it is possible to influence the input-side state of the inverter such that it selects a different point at which it, for example, functions more efficiently. For this reason, an additional direct current source and/or a direct current sink is provided in addition to the (first) direct current source in the system according to the invention. If the first direct current source supplies a voltage, or current, or output that does not correspond to the predetermined value, an input-side state corresponding to the predetermined value can be set at the direct current connection by means of the control method by accessing the additional direct current source. This applies similarly to the direct current sink which, for example, can be used when the voltage provided by the first direct current source, or the provided current, or the provided output, lies above the predetermined value.

The predetermined value to be set by the control method can be a voltage at the direct current connection, for example when the inverter is designed especially to work with a specific input voltage. Likewise, the predetermined value can be a direct current flowing through the direct current connection when, for example, the inverter is designed to work with a specific fixed current. Frequently, the predetermined value is an output supplied to the inverter by the direct current connection, or the output supplied from the inverter by the direct current connection, since many inverters are designed in terms of output. In one preferred embodiment, the control method according to the invention is operated such that at least two of the quantities mentioned below are regulated to a predetermined value, that is, the voltage at the direct current connection, and/or the current flowing through the direct current connection, and/or the output supplied through the direct current connection to the inverter, or the output supplied through the direct current connection from the inverter. Accordingly, embodiments are, for example, conceivable in which an inverter that is primarily designed in terms of output functions particularly well when there is a specific voltage level at the direct current connection. In such a case, the control method according to the invention can be used to control to a predetermined value for both the voltage at the direct current connection, as well as the output supplied to the inverter through the direct current connection, or the output supplied from the inverter through the direct current connection.

The predetermined value can also be 0. For example, it may be desirable to not supply any power from the inverter to a network connected at the output side to the inverter. This can be achieved if the output supplied to the inverter through the direct current connection is adjusted to the value 0 by means of the control method.

A variety of procedures are conceivable for establishing the predetermined value. For example, the output supplied to the inverter through the direct current connection, or the output supplied from the inverter through the direct current connection, can be fixed at a value so that the irregular behavior of a solar module string during a day with fast-moving clouds can be compensated for with respect to maximum transfer output. The maximum transfer output can be the maximum AC output that the inverter can deliver, defined by the design of the inverter. Likewise, the maximum transfer output can be less than the AC output of the inverter dictated merely by the design, for example when the inverter is connected at the output side to a power system, and the power system operators demand the continuous delivery of a specific AC output. Likewise, the power system operators may stipulate a specific reduction of output over a predetermined period, and the maximum transfer output can also have a negative value. It is therefore conceivable to minimize the power system load of a power system connected to the output side of the inverter and therefore limit the output supplied to the inverter through the direct current connection to a maximum value, and when the maximum value is exceeded, additional energy is stored in a battery (as an example of a direct current sink). Likewise, the control method according to the invention can be used to regulate the output supplied from the inverter through the direct current connection to a predetermined value that is required at a given time to supply a specific amount of energy from the power system, for example to maintain a charge of a direct current sink designed as battery storage.

In operating states in which the (first) direct current source supplies excess output not convertible by the inverter, the output can be employed for subsequent use by means of the control method according to the invention, for example in the evening or night, and for example, to subordinately charge an electrically operated motor vehicle which would then constitute a direct current sink. The fact that the inverter cannot convert part of the output provided at the direct current connection can be detected with pulsation methods which can read out the characteristic of the module string during the off phases of the inverter clocking. For example, an inverter can be clocked at 17 kHz, and a control unit for the method according to the invention can be clocked at 40 kHz. Measurements can be performed in the off phases of the inverter that arise. Likewise, external measuring elements such as irradiation sensors can determine the theoretically available DC output of the inverter.

In a preferred embodiment, the predetermined value is maintained for a predetermined time. For example, it is possible to regulate the predetermined value over several minutes, several hours, one day and one night, several days and nights, one month or several months. If, for example, it is desirable for the system according to the invention to feed a specific output into a power system provided at the output side of the inverter over a predetermined time interval (minutes, hours, days or months), this can be realized with the control method according to the invention and the system according to the invention, despite a first direct current source which may not continuously deliver the same output, as follows: Output is fed into the direct current sink, or output is drawn from the additional direct current source, such that the output supplied to the inverter through the direct current connection corresponds to the predetermined value over the given time period in which it is necessary to supply a predetermined output to the supply system. Embodiments are also possible in which the predetermined value is set to different values at different times, for example, different values can be specified over in the course of the day in the morning, midday, afternoon and evening.

In a preferred embodiment, the inverter has an alternating current connection, and the system has:
  a second voltage measuring device which can measure the voltage at the alternating current connection, and/or
  a second current measuring device which can measure the current flowing through the alternating current connection, and/or
  a second output detection unit that detects the output supplied to the inverter through the alternating current connection, or the output supplied from the inverter through the alternating current connection,
wherein the predetermined value is established depending on a value measured by the second voltage measuring device, the second current measuring device, and/or the second output the detection unit.

Particularly preferably, this embodiment can be used to adjust the amount of output supplied to the power system.

The inverter used within the context of the invention can be a power system inverter which is connected at the output side to a power system which is controlled by a power system operator. The inverter can also be any other type of converter or a stand-alone inverter to which an AC power system is connected at the output side and which is controlled by the inverter or the operator of the inverter.

The system according to the invention has an inverter with a direct current connection, a direct current source, and an additional direct current source or a direct current sink, wherein the direct current source and the additional direct current source or the direct current sink are connected in parallel to the direct current connection of the inverter.

The inverter has at least one DC/AC converter. The inverter can also have a DC/DC converter in addition to the DC/AC converter. This DC/DC converter can be downstream from the direct current connection. In a preferred embodiment of this development of the invention, a direct voltage link can be provided to which the DC/DC converter and a DC/AC converter are connected. In a particularly preferred embodiment, the additional direct current source, or the direct current sink of the system, are connected to the direct current connection and to the direct voltage link, as for example disclosed in FIG. 1 of DE 10 2012 109 420 A9. When the direct current source is connected to the direct voltage link, it is possible to exploit the full output spectrum of the DC/AC converter of the inverter. In practice, inverters are known that are designed for a low output level, for example in regard to the operation of their control unit, or in regard to the design of a possibly available DC/DC converter in which a mass-produced, more powerful DC/AC converter is installed to save costs. This means that with such an inverter, the DC/AC converter installed in the inverter is more powerful than is intended for the entire inverter. The company takes advantage of the savings from the mass production of a single DC/AC converter type and also installs more powerful DC/AC converters in inverters which they market for a lower output level. By contacting the additional direct current source directly with the direct voltage link provided according to the preferred embodiment, as well as possibly other provided components of the inverter, the possibility arises of exploiting the full output spectrum of the DC/AC converter installed in the inverter by supplying more output to the direct voltage link from the additional direct current source, even when the additional components of the converter would not permit using the full output spectrum of the DC/AC converter in this manner. Accordingly, by injecting additional output into the direct voltage link, a higher overall output can be enabled which lies above the indicated AC nominal output of the inverter.

If, according to a preferred embodiment, a separate connection to the inverter (housing) is available by means of which an external component such as the additional direct current source, or the direct current sink, can be connected to a direct voltage link of the inverter provided in a preferred embodiment, this connection can also be used to supply other consumers with direct voltage which the DC/AC converter draws from a power supply connected thereto at the output side, or from an additional, connected direct current source in a preferred design. For example, while circumventing the DC/AC conversion, emergency energy can be tapped by this connection, directly from the direct voltage link after being stepped up or stepped down by the DC/DC converter, to operate emergency lighting or pump circuits, for example when retrofitting the heating circulation pump to DC models. Likewise, while circumventing the DC/DC converter, emergency energy can be tapped directly from an AC power system connected at the output side to the converter and converted by the DC/AC converter.

The inverter can have a controller which can control the actuators of the inverter in order to enable MPP tracking. In a preferred embodiment, this controller has a signal output from which information on the operating point of the inverter can be tapped.

In a preferred embodiment, all of the components of the inverter are arranged within a housing. If, in a preferred embodiment, the inverter has a direct voltage link and the additional direct current source or direct current sink is connected to the direct voltage link, the housing can also have a connection, in addition to the direct current connection, to which the direct current source or the direct current sink can be connected in order to connect to the additional direct current source or direct current sink to the direct voltage link.

The system according to the invention has at least one direct current source which is also sometimes designated the first direct current source in this description. In a preferred embodiment, the direct current source is a photovoltaic module or a direct current source founded on a rotary generator such as a wind turbine with a rectifier, or a direct current source founded on a thermal generator such as a steam turbine with a connected generator and rectifier. The direct current source can, for example, also be a fuel cell. In addition to the direct current source, also designated as the additional direct current source in this description, the system according to the invention and the system to be controlled within the control system according to the invention can have a plurality of direct current sources, such as numerous photovoltaic module strings. The types of direct current sources can be mixed. Hence systems are conceivable, for example, in which photovoltaic modules, wind turbines with rectifiers or steam turbines with connected generators and rectifiers can be connected in parallel to each other.

In addition to the first direct current source, an additional direct current source and/or a direct current sink is provided in the system according to the invention, or in the system controlled by the control method according to the invention. Embodiments are possible in which an additional direct current source and a direct current sink are provided by a component such as a battery that is used as a direct current source in a first operating state and as a direct current sink in a second operating state, depending on whether output is drawn from the battery or the battery is being charged. A battery retained only for this purpose can be used as the battery. It is, however, conceivable for the battery to be part of an object that can be removed from the system such as a battery-operated motor vehicle. A reversible fuel cell can, for example, also be provided as a direct current sink which is used as a direct current source in a first operating mode, and as a direct current sink in a second operating mode. Likewise, assemblies are also conceivable as a direct current sink which convert excess electrical energy into thermal energy.

The system according to the invention provides for the use of a voltage measuring device which can measure the voltage at the direct current connection, and/or a current measuring device which can measure the current flowing through the direct current connection, and/or an output detection unit that measures the output supplied to the inverter through the direct current connection, or the output supplied from the inverter through the direct current connection. By means of such measuring devices or detection units, the control method according to the invention can check whether the predetermined value is present at the direct current connection.

For example, resistance networks or voltage divider circuits that can measure the voltage at the direct current connection are conceivable as the voltage measuring device, but any other suitable device is also conceivable.

Measuring shunts, current converters or Hall sensors, which can measure the current flowing through the direct current connection, are conceivable as the current measuring device, but any other suitable device is also conceivable.

For example, energy meters, or the calculation of current and voltage from detected values, are conceivable as the output detection unit which detects the output supplied to the inverter through the direct current connection, or the output supplied from the inverter to the direct current connection, however any other suitable device is also conceivable.

It is likewise conceivable to indirectly detect voltage, current or output, for example when the module characteristics of a PV string used as the direct current source are known. A back calculation could then be performed using the irradiation and temperature.

The advantages according to the invention can already be achieved when one of the three devices, i.e., a voltage measuring device, a current measuring device or output detection unit, is provided. It is especially preferred when, however, all three devices, i.e. a voltage measuring device, a current measuring device and an output detection unit, are provided to monitor the process with as much precision as possible. Furthermore, it is possible to provide only one voltage measuring device and one current measuring device, or only one current measuring device and one output detection unit, or only one voltage measuring device and one output detection unit.

Furthermore, an actuator is provided in the system, by means of which the voltage at the direct current source, and/or the current supplied by the direct current source, and/or the output supplied by the direct current source, are adjustable. If a plurality of direct current sources are provided as part of the system, such as a first direct current source, such as a photovoltaic module and an additional direct current source, such as a battery, either only one actuator can be provided in the system according to the invention, such as an actuator by means of which the voltage at the first direct current source, and/or the current supplied by the first direct current source, and/or the output supplied by the first direct current source, is adjustable. Furthermore, it is conceivable to provide only one actuator, that is, an actuator by means of which the voltage at the direct current source, and/or the current supplied by the direct current source, and/or the output supplied by the direct current source, are adjustable. Likewise, two actuators can also be provided: one which can adjust the voltage at the first direct current source, and/or the current supplied by the first direct current source, and/or the output supplied by the first direct current source, and one which can adjust the voltage at the additional direct current source, and/or are the current supplied by the additional direct current source, and/or the output supplied by the additional direct current source. Comparable possible combinations exist given the presence of a direct current sink, or the presence of an additional direct current source and a direct current sink.

The combinations listed in the following tables are possible embodiments of the system according to the invention:

System with a (first) direct current source and an additional direct current source:

| Version | One actuator that can adjust the voltage at the first direct current source | One actuator that can adjust the current supplied by the first direct current source | One actuator that can adjust the output supplied by the first direct current source | One actuator that can adjust the voltage at the additional direct current source | One actuator that can adjust the current supplied by the additional direct current source | One actuator that can adjust the output supplied by the additional direct current source |
|---|---|---|---|---|---|---|
| 1 | Available | Available | Available | Not available | Not available | Not available |
| 2 | Not available | Available | Available | Not available | Not available | Not available |
| 3 | Not available | Not available | Available | Not available | Not available | Not available |
| 4 | Available | Available | Not available | Not available | Not available | Not available |
| 5 | Available | Not available | Available | Not available | Not available | Not available |
| 6 | Available | Not available | Not available | Not available | Not available | Not available |
| 7 | Not available | Available | Not available | Not available | Not available | Not available |
| 8 | Available | Available | Available | Available | Available | Available |
| 9 | Not available | Available | Available | Available | Available | Available |
| 10 | Not available | Not available | Available | Available | Available | Available |
| 11 | Available | Available | Not available | Available | Available | Available |
| 12 | Available | Not available | Available | Available | Available | Available |
| 13 | Available | Not available | Not available | Available | Available | Available |
| 14 | Not available | Available | Not available | Available | Available | Available |
| 15 | Not available | Not available | Not available | Available | Available | Available |
| 16 | Available | Available | Available | Not available | Available | Available |
| 17 | Not available | Available | Available | Not available | Available | Available |
| 18 | Not available | Not available | Available | Not available | Available | Available |
| 19 | Available | Available | Not available | Not available | Available | Available |
| 20 | Available | Not available | Available | Not available | Available | Available |
| 21 | Available | Not available | Not available | Not available | Available | Available |
| 22 | Not available | Available | Not available | Not available | Available | Available |
| 23 | Not available | Not available | Not available | Not available | Available | Available |
| 24 | Available | Available | Available | Not available | Not available | Available |
| 25 | Not available | Available | Available | Not available | Not available | Available |
| 26 | Not available | Not available | Available | Not available | Not available | Available |
| 27 | Available | Available | Not available | Not available | Not available | Available |
| 28 | Available | Not available | Available | Not available | Not available | Available |
| 29 | Available | Not available | Not available | Not available | Not available | Available |
| 30 | Not available | Available | Not available | Not available | Not available | Available |
| 31 | Not available | Not available | Not available | Not available | Not available | Available |
| 32 | Available | Available | Available | Available | Available | Not available |
| 33 | Not available | Available | Available | Available | Available | Not available |
| 34 | Not available | Not available | Available | Available | Available | Not available |
| 35 | Available | Available | Not available | Available | Available | Not available |
| 36 | Available | Not available | Available | Available | Available | Not available |
| 37 | Available | Not available | Not available | Available | Available | Not available |
| 38 | Not available | Available | Not available | Available | Available | Not available |
| 39 | Not available | Not available | Not available | Available | Available | Not available |
| 40 | Available | Available | Available | Available | Not available | Available |
| 41 | Not available | Available | Available | Available | Not available | Available |
| 42 | Not available | Not available | Available | Available | Not available | Available |
| 43 | Available | Available | Not available | Available | Not available | Available |
| 44 | Available | Not available | Available | Available | Not available | Available |
| 45 | Available | Not available | Not available | Available | Not available | Available |
| 46 | Not available | Available | Not available | Available | Not available | Available |
| 47 | Not available | Not available | Not available | Available | Not available | Available |
| 48 | Available | Available | Available | Available | Not available | Not available |
| 49 | Not available | Available | Available | Available | Not available | Not available |

-continued

| Version | One actuator that can adjust the voltage at the first direct current source | One actuator that can adjust the current supplied by the first direct current source | One actuator that can adjust the output supplied by the first direct current source | One actuator that can adjust the voltage at the additional direct current source | One actuator that can adjust the current supplied by the additional direct current source | One actuator that can adjust the output supplied by the additional direct current source |
|---|---|---|---|---|---|---|
| 50 | Not available | Not available | Available | Available | Not available | Not available |
| 51 | Available | Available | Not available | Available | Not available | Not available |
| 52 | Available | Not available | Available | Available | Not available | Not available |
| 53 | Available | Not available | Not available | Available | Not available | Not available |
| 54 | Not available | Available | Not available | Available | Not available | Not available |
| 55 | Not available | Not available | Not available | Available | Not available | Not available |
| 56 | Available | Available | Available | Not available | Available | Not available |
| 57 | Not available | Available | Available | Not available | Available | Not available |
| 58 | Not available | Not available | Available | Not available | Available | Not available |
| 59 | Available | Available | Not available | Not available | Available | Not available |
| 60 | Available | Not available | Available | Not available | Available | Not available |
| 61 | Available | Not available | Not available | Not available | Available | Not available |
| 62 | Not available | Available | Not available | Not available | Available | Not available |
| 63 | Not available | Not available | Not available | Not available | Available | Not available |

System with one direct current source and one direct current source:

| Version | One actuator that can adjust the voltage at the first direct current source | One actuator that can adjust the current supplied by the first direct current source | One actuator that can adjust the output supplied by the first direct current source | One actuator that can adjust the voltage at the direct current source | One actuator that can adjust the current supplied by the direct current sink | One actuator that can adjust the output supplied by the direct current sink |
|---|---|---|---|---|---|---|
| 64 | Available | Available | Available | Not available | Not available | Not available |
| 65 | Not available | Available | Available | Not available | Not available | Not available |
| 66 | Not available | Not available | Available | Not available | Not available | Not available |
| 67 | Available | Available | Not available | Not available | Not available | Not available |
| 68 | Available | Not available | Available | Not available | Not available | Not available |
| 69 | Available | Not available | Not available | Not available | Not available | Not available |
| 70 | Not available | Available | Not available | Not available | Not available | Not available |
| 71 | Available | Available | Available | Available | Available | Available |
| 72 | Not available | Available | Available | Available | Available | Available |
| 73 | Not available | Not available | Available | Available | Available | Available |
| 74 | Available | Available | Not available | Available | Available | Available |
| 75 | Available | Not available | Available | Available | Available | Available |
| 76 | Available | Not available | Not available | Available | Available | Available |
| 77 | Not available | Available | Not available | Available | Available | Available |
| 78 | Not available | Not available | Not available | Available | Available | Available |
| 79 | Available | Available | Available | Not available | Available | Available |
| 80 | Not available | Available | Available | Not available | Available | Available |
| 81 | Not available | Not available | Available | Not available | Available | Available |
| 82 | Available | Available | Not available | Not available | Available | Available |
| 83 | Available | Not available | Available | Not available | Available | Available |
| 84 | Available | Not available | Not available | Not available | Available | Available |
| 85 | Not available | Available | Not available | Not available | Available | Available |
| 86 | Not available | Not available | Not available | Not available | Available | Available |
| 87 | Available | Available | Available | Not available | Not available | Available |
| 88 | Not available | Available | Available | Not available | Not available | Available |
| 89 | Not available | Not available | Available | Not available | Not available | Available |
| 90 | Available | Available | Not available | Not available | Not available | Available |
| 91 | Available | Not available | Available | Not available | Not available | Available |
| 92 | Available | Not available | Not available | Not available | Not available | Available |
| 93 | Not available | Available | Not available | Not available | Not available | Available |
| 94 | Not available | Not available | Not available | Not available | Not available | Available |
| 95 | Available | Available | Available | Available | Available | Not available |
| 96 | Not available | Available | Available | Available | Available | Not available |
| 97 | Not available | Not available | Available | Available | Available | Not available |
| 98 | Available | Available | Not available | Available | Available | Not available |
| 99 | Available | Not available | Available | Available | Available | Not available |
| 100 | Available | Not available | Not available | Available | Available | Not available |
| 101 | Not available | Available | Not available | Available | Available | Not available |
| 102 | Not available | Not available | Not available | Available | Available | Not available |
| 103 | Available | Available | Available | Available | Not available | Available |

-continued

| Version | One actuator that can adjust the voltage at the first direct current source | One actuator that can adjust the current supplied by the first direct current source | One actuator that can adjust the output supplied by the first direct current source | One actuator that can adjust the voltage at the direct current source | One actuator that can adjust the current supplied by the direct current sink | One actuator that can adjust the output supplied by the direct current sink |
|---|---|---|---|---|---|---|
| 104 | Not available | Available | Available | Available | Not available | Available |
| 105 | Not available | Not available | Available | Available | Not available | Available |
| 106 | Available | Available | Not available | Available | Not available | Available |
| 107 | Available | Not available | Available | Available | Not available | Available |
| 108 | Available | Not available | Not available | Available | Not available | Available |
| 109 | Not available | Available | Not available | Available | Not available | Available |
| 110 | Not available | Not available | Not available | Available | Not available | Available |
| 111 | Available | Available | Available | Available | Not available | Not available |
| 112 | Not available | Available | Available | Available | Not available | Not available |
| 113 | Not available | Not available | Available | Available | Not available | Not available |
| 114 | Available | Available | Not available | Available | Not available | Not available |
| 115 | Available | Not available | Available | Available | Not available | Not available |
| 116 | Available | Not available | Not available | Available | Not available | Not available |
| 117 | Not available | Available | Not available | Available | Not available | Not available |
| 118 | Not available | Not available | Not available | Available | Not available | Not available |
| 119 | Available | Available | Available | Not available | Available | Not available |
| 120 | Not available | Available | Available | Not available | Available | Not available |
| 121 | Not available | Not available | Available | Not available | Available | Not available |
| 122 | Available | Available | Not available | Not available | Available | Not available |
| 123 | Available | Not available | Available | Not available | Available | Not available |
| 124 | Available | Not available | Not available | Not available | Available | Not available |
| 125 | Not available | Available | Not available | Not available | Available | Not available |
| 126 | Not available | Not available | Not available | Not available | Available | Not available |

System with a direct current source and a component that can be used in a first operating mode as the direct current source, and in a second operating mode as the direct current sync:

| Version | One actuator that can adjust the voltage at the first direct current source | One actuator that can adjust the current supplied by the first direct current source | One actuator that can adjust the output supplied by the first direct current source | One actuator that can adjust the voltage at the component | One actuator that can adjust the current supplied by the component | One actuator that can adjust the output supplied by the component |
|---|---|---|---|---|---|---|
| 127 | Available | Available | Available | Not available | Not available | Not available |
| 128 | Not available | Available | Available | Not available | Not available | Not available |
| 129 | Not available | Not available | Available | Not available | Not available | Not available |
| 130 | Available | Available | Not available | Not available | Not available | Not available |
| 131 | Available | Not available | Available | Not available | Not available | Not available |
| 132 | Available | Not available | Not available | Not available | Not available | Not available |
| 133 | Not available | Available | Not available | Not available | Not available | Not available |
| 134 | Available | Available | Available | Available | Available | Available |
| 135 | Not available | Available | Available | Available | Available | Available |
| 136 | Not available | Not available | Available | Available | Available | Available |
| 137 | Available | Available | Not available | Available | Available | Available |
| 138 | Available | Not available | Available | Available | Available | Available |
| 139 | Available | Not available | Not available | Available | Available | Available |
| 140 | Not available | Available | Not available | Available | Available | Available |
| 141 | Not available | Not available | Not available | Available | Available | Available |
| 142 | Available | Available | Available | Not available | Available | Available |
| 143 | Not available | Available | Available | Not available | Available | Available |
| 144 | Not available | Not available | Available | Not available | Available | Available |
| 145 | Available | Available | Not available | Not available | Available | Available |
| 146 | Available | Not available | Available | Not available | Available | Available |
| 147 | Available | Not available | Not available | Not available | Available | Available |
| 148 | Not available | Available | Not available | Not available | Available | Available |
| 149 | Not available | Not available | Not available | Not available | Available | Available |
| 150 | Available | Available | Available | Not available | Not available | Available |
| 151 | Not available | Available | Available | Not available | Not available | Available |
| 152 | Not available | Not available | Available | Not available | Not available | Available |
| 153 | Available | Available | Not available | Not available | Not available | Available |
| 154 | Available | Not available | Available | Not available | Not available | Available |

-continued

| Version | One actuator that can adjust the voltage at the first direct current source | One actuator that can adjust the current supplied by the first direct current source | One actuator that can adjust the output supplied by the first direct current source | One actuator that can adjust the voltage at the component | One actuator that can adjust the current supplied by the component | One actuator that can adjust the output supplied by the component |
|---|---|---|---|---|---|---|
| 155 | Available | Not available | Not available | Not available | Not available | Available |
| 156 | Not available | Available | Not available | Not available | Not available | Available |
| 157 | Not available | Not available | Not available | Not available | Not available | Available |
| 158 | Available | Available | Available | Available | Available | Not available |
| 159 | Not available | Available | Available | Available | Available | Not available |
| 160 | Not available | Not available | Available | Available | Available | Not available |
| 161 | Available | Available | Not available | Available | Available | Not available |
| 162 | Available | Not available | Available | Available | Available | Not available |
| 163 | Available | Not available | Not available | Available | Available | Not available |
| 164 | Not available | Available | Not available | Available | Available | Not available |
| 165 | Not available | Not available | Not available | Available | Available | Not available |
| 166 | Available | Available | Available | Available | Not available | Available |
| 167 | Not available | Available | Available | Available | Not available | Available |
| 168 | Not available | Not available | Available | Available | Not available | Available |
| 169 | Available | Available | Not available | Available | Not available | Available |
| 170 | Available | Not available | Available | Available | Not available | Available |
| 171 | Available | Not available | Not available | Available | Not available | Available |
| 172 | Not available | Available | Not available | Available | Not available | Available |
| 173 | Not available | Not available | Not available | Available | Not available | Available |
| 174 | Available | Available | Available | Available | Not available | Not available |
| 175 | Not available | Available | Available | Available | Not available | Not available |
| 176 | Not available | Not available | Available | Available | Not available | Not available |
| 177 | Available | Available | Not available | Available | Not available | Not available |
| 178 | Available | Not available | Available | Available | Not available | Not available |
| 179 | Available | Not available | Not available | Available | Not available | Not available |
| 180 | Not available | Available | Not available | Available | Not available | Not available |
| 181 | Not available | Not available | Not available | Available | Not available | Not available |
| 182 | Available | Available | Available | Not available | Available | Not available |
| 183 | Not available | Available | Available | Not available | Available | Not available |
| 184 | Not available | Not available | Available | Not available | Available | Not available |
| 185 | Available | Available | Not available | Not available | Available | Not available |
| 186 | Available | Not available | Available | Not available | Available | Not available |
| 187 | Available | Not available | Not available | Not available | Available | Not available |
| 188 | Not available | Available | Not available | Not available | Available | Not available |
| 189 | Not available | Not available | Not available | Not available | Available | Not available |

In a preferred embodiment, a semiconductor switch can be used as the actuator that is installed in the DC/DC converter in an inverter equipped with a DC/DC converter. In practice, it is known that DC/DC converters are installed in converters equipped with two semiconductor switches which can assume the job of the actuator so that the invention can be implemented with commercially available inverters. The invention is then implemented using an alternative actuation pattern of the semiconductors. An advantage of this embodiment is the few number of necessary components. It can, for example, be realized with two semiconductor switches and two diodes (a blocking diode and a freewheeling diode). In this embodiment, the output is delivered through the step-up semiconductor switch, and the output is received through the step-down semiconductor switch. The voltage and/or the current are then adjusted merely by appropriate actuation conditions.

Alternatively, instead of the aforementioned semiconductor switches, an electromechanical switch, or a switching function group that operates in any other way, can be used so as to realize a DC/DC actuator.

A switching element in a biomechanical form would also be conceivable.

It would also be conceivable to realize a switching element based on an electromagnetic field generator that enables the switching action by cutting off or opening the flow of electrons in the galvanically decoupled conductor.

In a preferred embodiment, the system has a DC bus that is connected to the direct current connection, and to which the direct current source and additional direct current source, or direct current sink, are connected. The common DC bus can have a specific, constant voltage. Alternately, a common DC bus can be used which has a variable voltage.

A system according to the invention can have a higher-level control unit which assumes the control of all flows of energy within the system, and which dictates operating points to the inverter and the additional components of the system. On the one hand, this makes it possible to depict operating situations in which the inverter adjusts the excess energy in the direction of the maximum open circuit voltage (nonlinear region) arising from overdesigning the inverter. Likewise, operating situations can be depicted in which the energy is reduced by adjusting to the short-circuit range and by reducing the voltage (linear region). The system can therefore achieve greater output without causing instability in the behavior of the remaining connected assemblies. The implementation of the described features is preferably achieved by changing the switch-on and switch-off times of the power semiconductors preferably installed in the individual assemblies.

In one preferred embodiment, individual elements of the system are combined into a box. For example, the parallel connection of the (first) direct current source to the additional direct current source or the direct current sink at the direct current connection can be made available by providing a connection box with an inlet side to which the first direct current source is connected, and an outlet side that is connected to the direct current connection. A connection for the additional direct current source or direct current sink is also provided on the box. Within the box, the lines leading to the connections are joined so as to produce the parallel connection. Such a box makes it easy to handle and retrofit existing systems into a system according to the invention, or to apply the control method according to the invention to existing systems. In order to make available the system according to the invention, an existing system in which a direct current source is connected to the direct current connection of an inverter only has to be modified so that the direct current source is connected to the connection of the connection box, and the output of the connection box is connected to the direct current connection. Then the additional direct current source or direct current sink is connected to the additional connection of the connection box. Embodiments are also conceivable in which the additional direct current source or direct current sink is not connected separately to the connection of the connection box, but is integrated in the connection box instead. The connection box can be connected to any inverter.

It is particularly preferable for the connection to have a control unit, and furthermore, if available, the voltage measuring device which can measure the voltage at the direct current connection, and/or the current measuring device which can measure the current flowing through the direct current connection, and/or the output detection unit that measures the output supplied to the inverter through the direct current connection, or the output supplied from the inverter through the direct current connection. Since in one preferred embodiment the output of the connection box is connected directly to the direct current connection, the measured values can be detected at the output of the connection box without loss of information.

Information on different converter configurations can be saved in the control unit. This makes it possible to produce the connection box as a serial component which is adapted to the system configuration, especially to the inverter available in the system, merely by selecting a parameter configuration.

Hence, in one preferred embodiment, the connection box can be used universally. This holds true not only in regard to the downstream inverter but also in regard to the employed additional direct current source or the employed direct current sink. It is therefore possible to provide all of the necessary charging algorithms in the control unit of the connection box for different voltage levels and battery designs. The connection box can function within a wide voltage range, such as from 48 VDC to 1000 VDC, wherein, in one preferred embodiment, a limitation of the output within a threshold range can be set by limiting the current at the input side and output side. In one preferred embodiment, the connection box is designed for an average operating input voltage of approximately 205 VDC. With such a configuration, e.g. 2500 W output can be transferred. If the input voltage is lowered, the delivered output can still be maintained at 750 W.

In the following, the invention will be further explained with reference to FIG. 1.

Figure 1:
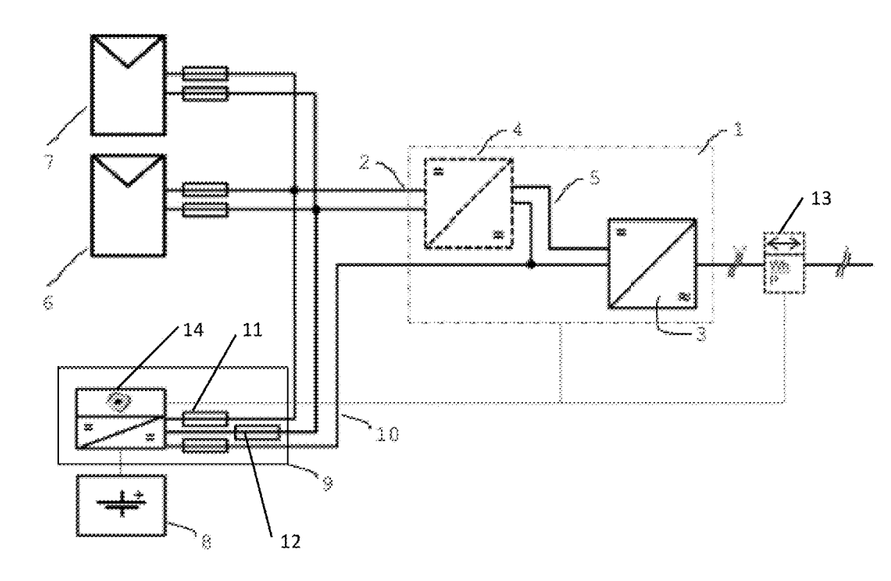
FIG. 1 is a block diagram of an inverter according to an embodiment of the disclosure.

The system depicted in FIG. 1 has an inverter 1 with a direct current connection 2. The inverter has a DC/AC converter 3 and a DC/DC converter 4. Furthermore, the inverter has a direct voltage link 5 by means of which the DC/DC 4 converter and DC/AC converter 5 are connected. The system according to the invention furthermore has two direct current sources 6, 7 in the form of solar modules. The direct current sources 6, 7 are connected in parallel. Furthermore, the system according to the invention has an additional direct current source and a direct current sink in the form of a battery 8 that can be used as a direct current source in a first operating mode, and as a direct current sink in a second operating mode. The two direct current sources 6, 7 and the battery 8 are connected in parallel to the direct current connection 2 of the inverter 1. A connection box 9 is provided. In particular, the control unit and DC/DC control element 14 for executing the control method according to the invention are located in this connection box 9. The measuring devices 11, 12 for the applied voltage at the direct current connection 2 and the current flowing through the direct current connection 2 are also in the connection box 9. By directly connecting in parallel the connection box 9 to the direct current connection 2, the measuring devices integrated in the connection box 9 can perform these measurements. Furthermore, a measuring device 13 is provided at the output side of the inverter 1 for the output supplied at the output side.

The connection box and hence the battery 8 are connected to the direct voltage link 5 by means of an additional line 10.

The invention claimed is:

1. A control method for a system, comprising the steps of:
providing an inverter having a direct current connection, a direct current source, and at least one of an additional direct current source and a direct current sink, wherein the direct current source and the at least one of the additional direct current source and the direct current sink are connected in parallel to the direct current connection of the inverter;
measuring at least one of:
 a voltage at the direct current connection of the inverter, by a voltage measuring device,
 a current flowing through the direct current connection, by a current measuring device,
 an output supplied to the inverter through the direct current connection, and
 an output supplied by the inverter through the direct current connection by an output detection unit,
controlling an actuator, configured to adjust one or more parameters of the system, said parameters comprising:
 a voltage at the direct current source;
 a current supplied by the direct current source;
 an output supplied by the direct current source;
 a voltage at the direct current sink;
 a current drawn by the direct current sink; and
 an output supplied from the inverter through the direct current connection;
to adjust said one or more parameters to maintain a predetermined value of at least one of said measured voltage value, said measured current value, and said detected output supplied to said inverter or said detected output supplied from said inverter, wherein the predetermined values of at least one of said measured voltage value, said measured current value, and said detected output supplied to said inverter or said detected output supplied from said inverter are chosen such that the inverter functions at a predetermined operating point.

2. The control method according to claim 1, further comprising:

controlling said actuator to maintain, for a predetermined period of time, said predetermined value of said one or more of:
a voltage at the direct current source;
a current flowing through the direct current source;
an output supplied to the inverter through the direct current connection; and
an output supplied from the inverter through the direct current connection.

3. The control method according to claim 1 further comprising:
measuring a voltage at an alternating current connection of the inverter using a second voltage measuring device;
measuring a current flowing through the alternating current connection using a second current measuring device;
measuring one of an output supplied to the inverter through the alternating current connection and an output supplied from the inverter through the alternating current connection using a second output detection unit;
wherein the predetermined value of at least one of said measured voltage value, said measured current value, and said detected output supplied to said inverter or said detected output supplied from said inverter is established based on at least one of a value measured by the second voltage measuring device, a value measured by the second current measuring device, and a value detected by the second output detection unit.

4. A system comprising:
an inverter having a direct current connection, a first direct current source, and at least one of an additional direct current source and a direct current sink, wherein the direct current source and the additional at least one of direct current source and the direct current sink are connected in parallel to the direct current connection of the inverter;
an actuator configured to adjust one or more parameters of the system, said parameters comprising:
a voltage at the direct current source;
a current supplied by the direct current source;
an output supplied by the direct current source;
a voltage at the direct current sink;
a current drawn by the direct current sink; and
an output drawn by the direct current sink, and at least one of:
a voltage measuring device configured to measure the voltage at the direct current connection,
a current measuring device configured to measure the current flowing through the direct current connection,
an output detecting unit configured to detect one of the output supplied to the inverter through the direct current connection and the output supplied from the inverter through the direct current connection,
said system further comprising a control unit, configured to control flows of energy within said system and to dictate operating points to components of said system.

5. The system of claim 4, wherein said voltage measuring device comprises one of a resistor network and a voltage divider circuit, and wherein said current measuring device comprises one of a measuring shunt, a current converter, and a Hall sensor.

6. The system of claim 4, wherein said direct current source comprises one of: a photovoltaic module, a string of photovoltaic modules, a wind turbine with an inverter, and a steam turbine with a connected generator and inverter.

7. The system of claim 4, further comprising, a battery configured to be used as a direct current source in a first operating mode, and as a direct current sink in a second operating mode.

8. The system of claim 4, wherein said actuator comprises a semiconductor switch.

9. The system of claim 8, wherein said semiconductor switch is connected to a DC/DC converter within said inverter.

10. The system of claim 4, wherein said actuator comprises an electromechanical switch.

11. The system of claim 4, wherein said actuator comprises an electromagnetic field generator, said electromagnetic field generator configured to restrict or open a flow of electrons in a galvanically decoupled conductor.

12. The system of claim 4, further comprising a connection box comprising:
an inlet side; and
an outlet side,
wherein said first direct current source and one of, said additional direct current source and said direct current drain and said outlet side is connected to said direct current connection.

13. The system of claim 12, wherein said inlet side of said connection box includes lines leading to connections for said first direct current source and said additional direct current source or direct current sink, said lines being joined such that one of said first direct current source, said additional direct current source and said direct current sink are electrically connected in parallel to said direct current connection.

14. The system of claim 12, wherein one of said additional direct current source and direct current sink is integrated into said connection box.

15. The system of claim 12, wherein said connection box comprises said at least one of said voltage measuring device, said current measuring device, and said output detection unit.

16. A system comprising:
an inverter having a direct current connection, a first direct current source, and at least one of an additional direct current source and a direct current sink, wherein the direct current source and the additional at least one of direct current source and the direct current sink are connected in parallel to the direct current connection of the inverter;
an actuator configured to adjust one or more parameters of the system, said parameters comprising:
a voltage at the direct current source;
a current supplied by the direct current source;
an output supplied by the direct current source;
a voltage at the direct current sink;
a current drawn by the direct current sink; and
an output drawn by the direct current sink, and
at least one of:
a voltage measuring device configured to measure the voltage at the direct current connection,
a current measuring device configured to measure the current flowing through the direct current connection,
an output detecting unit configured to detect one of the output supplied to the inverter through the direct current connection and the output supplied from the inverter through the direct current connection, wherein said actuator comprises a first semiconductor switch and a first diode coupled to a DC/DC converter of said inverter and configured as a step-up switch, and a second semiconductor switch and a second diode coupled to said DC/DC converter of said inverter and configured as a step-down switch.

17. A system comprising:
an inverter having a direct current connection, a first direct current source, and at least one of an additional direct current source and a direct current sink, wherein the direct current source and the additional at least one of direct current source and the direct current sink are connected in parallel to the direct current connection of the inverter;
an actuator configured to adjust one or more parameters of the system, said parameters comprising:
a voltage at the direct current source;
a current supplied by the direct current source;
an output supplied by the direct current source;
a voltage at the direct current sink;
a current drawn by the direct current sink; and
an output drawn by the direct current sink, and
at least one of:
a voltage measuring device configured to measure the voltage at the direct current connection,
a current measuring device configured to measure the current flowing through the direct current connection,
an output detecting unit configured to detect one of the output supplied to the inverter through the direct current connection and the output supplied from the inverter through the direct current connection,
wherein the system further comprises: a DC bus connected to said direct current connection, said direct current source and one of said additional direct current source and said direct current sink.

18. The system of claim 17, wherein said actuator comprises a semiconductor switch.

19. A system comprising:
an inverter having a direct current connection, a first direct current source, and at least one of an additional direct current source and a direct current sink, wherein the direct current source and the additional at least one of direct current source and the direct current sink are connected in parallel to the direct current connection of the inverter;
an actuator configured to adjust one or more parameters of the system, said parameters comprising:
a voltage at the direct current source;
a current supplied by the direct current source;
an output supplied by the direct current source;
a voltage at the direct current sink;
a current drawn by the direct current sink; and
an output drawn by the direct current sink, and
at least one of:
a voltage measuring device configured to measure the voltage at the direct current connection,
a current measuring device configured to measure the current flowing through the direct current connection,
an output detecting unit configured to detect one of the output supplied to the inverter through the direct current connection and the output supplied from the inverter through the direct current connection, wherein the inverter comprises:
a DC/DC converter downstream from the direct current connection;
a direct voltage link connected between said DC/DC converter and a DC/AC converter, wherein one of said additional direct current source, and direct current sink of the system, is connected to the direct current connection and to the direct voltage link.

20. The system of claim 19, wherein said voltage measuring device comprises one of a resistor network and a voltage divider circuit, and wherein said current measuring device comprises one of a measuring shunt, a current converter, and a Hall sensor.

* * * * *